July 10, 1956  C. B. DE VLIEG  2,753,725
SPIRAL GEAR TRANSMISSION WITH GEAR-CLUTCH
Filed Aug. 20, 1952  6 Sheets-Sheet 1

Inventor
Charles B. De Vlieg
By McKenna & Morsbach
Attys.

July 10, 1956

C. B. DE VLIEG 2,753,725

SPIRAL GEAR TRANSMISSION WITH GEAR-CLUTCH

Filed Aug. 20, 1952

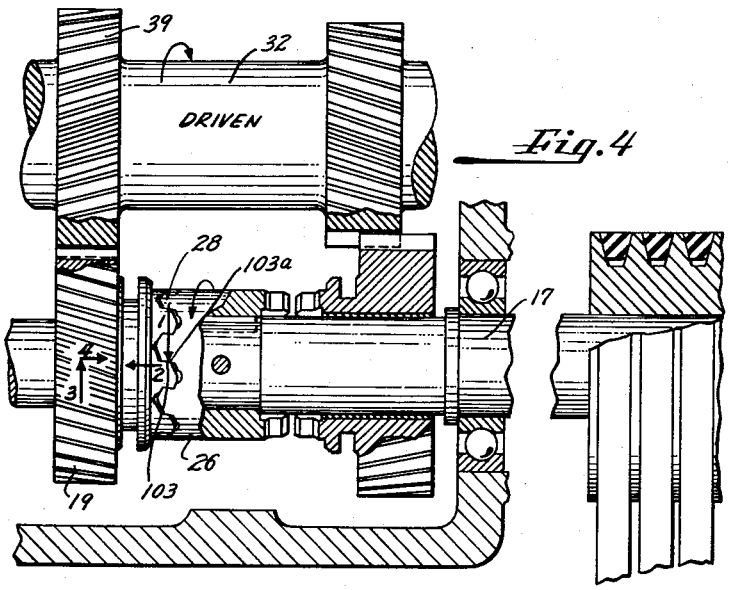

Fig.4

3- LINE OF ACTION OF RESISTANCE
OFFERED BY DRIVEN GEAR
(TANGENTIAL TOOTH LOAD)

4- LINE OF ACTION OF RESULTANT
THRUST LOAD ON DRIVING GEAR
(DRIVEN GEAR FIXED TO ITS SHAFT)

1- LINE OF ACTION OF POWER
BEING TRANSMITTED FROM
CLUTCH 26 TO GEAR-CLUTCH UNIT 19-23

2- LINE OF ACTION OF RESULTANT
THRUST LOAD ON GEAR-CLUTCH
UNIT 19-23

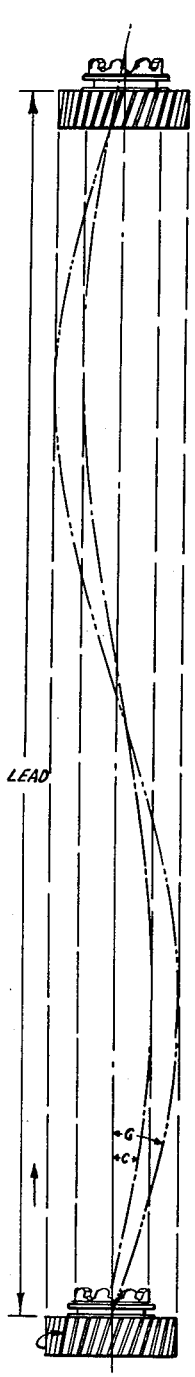

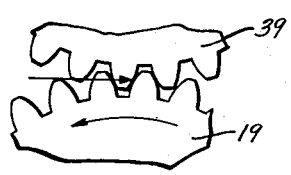

Inventor
Charles B. DeVlieg
By McCanna & Morsbach
Attys.

July 10, 1956  C. B. DE VLIEG  2,753,725
SPIRAL GEAR TRANSMISSION WITH GEAR-CLUTCH
Filed Aug. 20, 1952  6 Sheets-Sheet 4

PATH OF TRAVEL OF WORK IN RELATION TO ₵ OF CUTTER.

PATH OF TRAVEL OF WORK IN RELATION TO ₵ OF CUTTER.

PATH OF TRAVEL OF WORK IN RELATION TO SHAPING CUTTER.

Inventor
Charles B. De Vlieg
By McCanna & Morsbach
Attys.

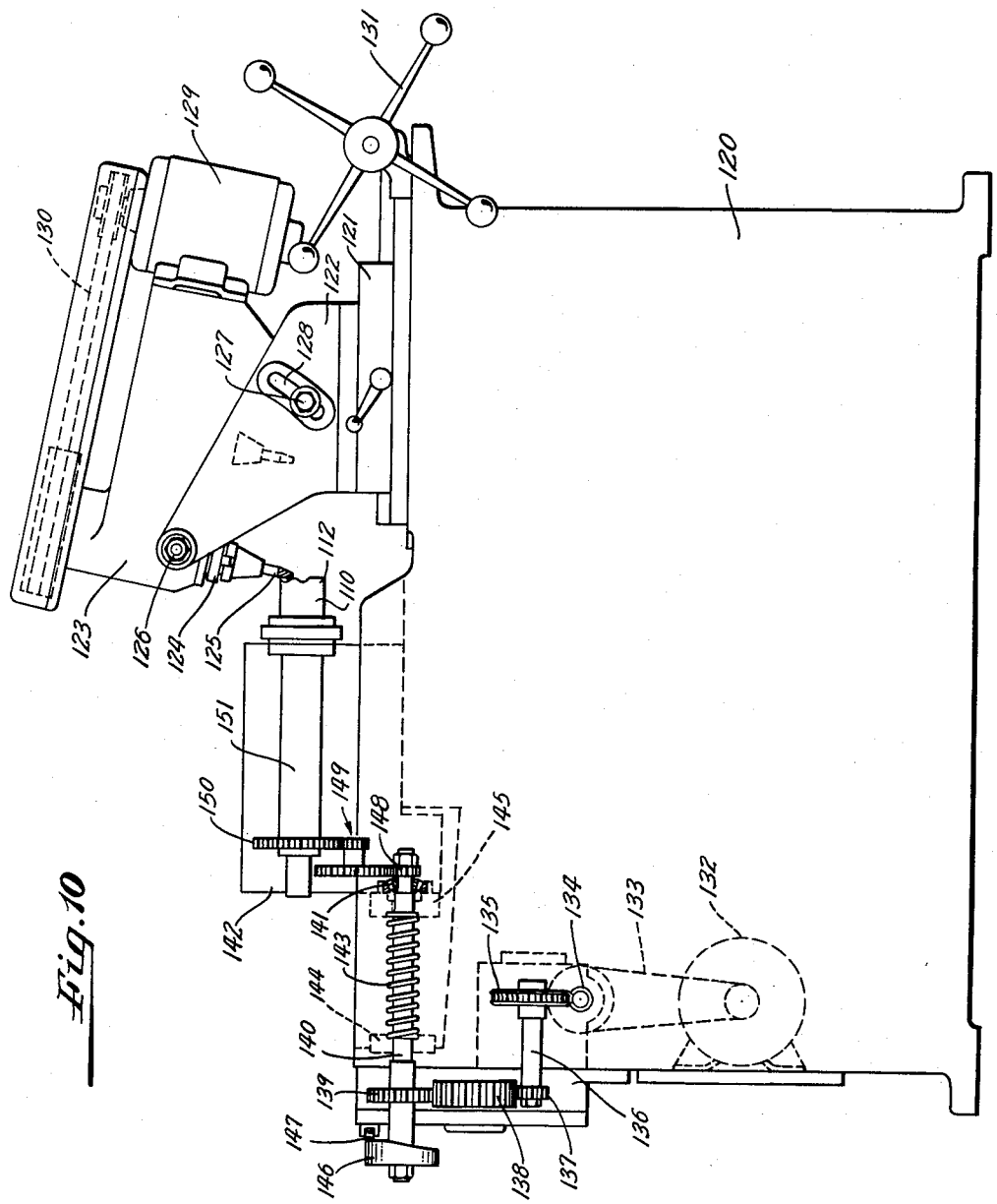

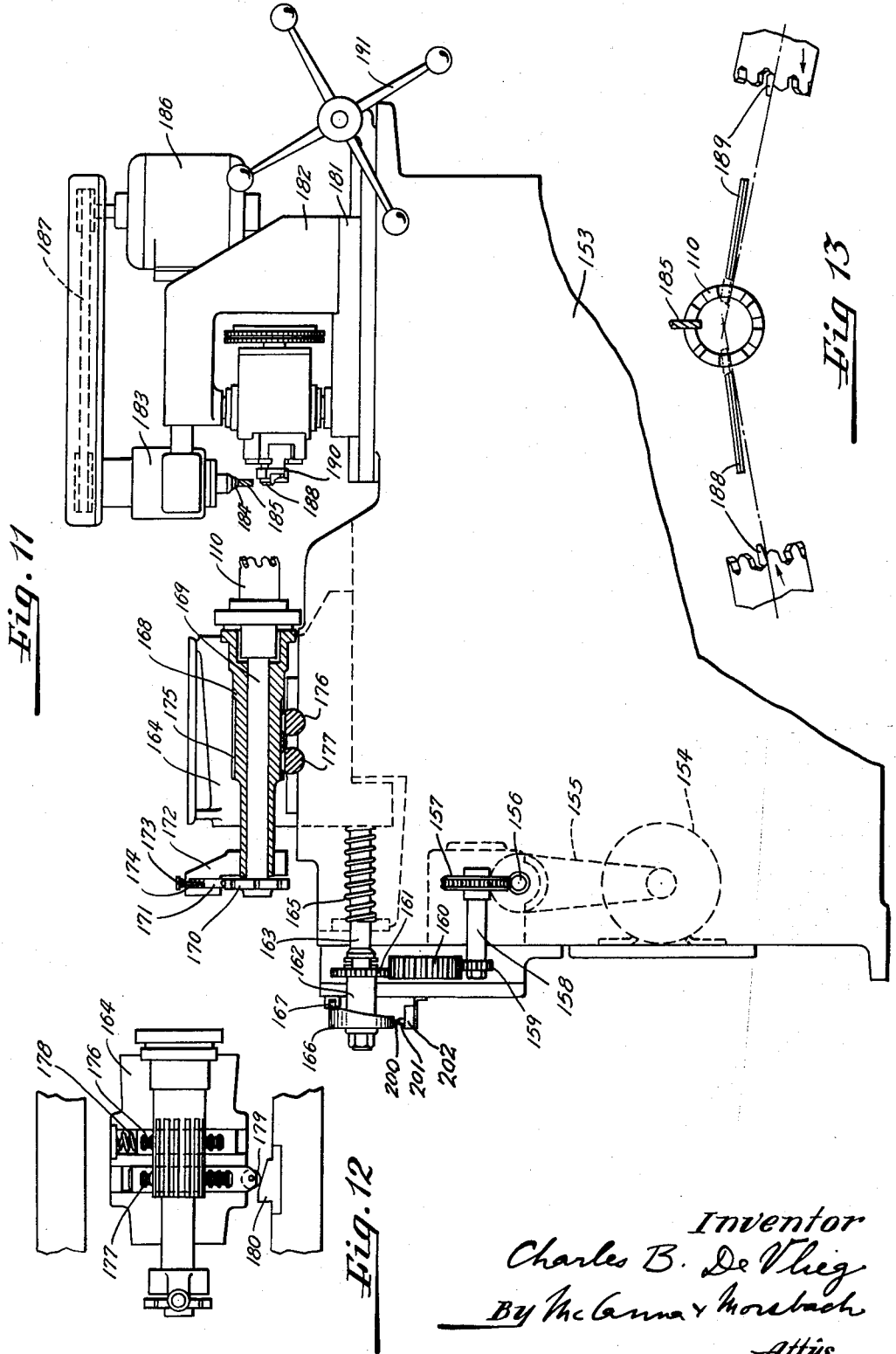

United States Patent Office 2,753,725
Patented July 10, 1956

2,753,725

SPIRAL GEAR TRANSMISSION WITH GEAR-CLUTCH

Charles B. De Vlieg, Farmington, Mich.

Application August 20, 1952, Serial No. 305,386

19 Claims. (Cl. 74—333)

This invention relates generally to change-speed gear transmissions and has more particular reference to transmission mechanisms having gear trains operable for transmitting a power drive from a rotary driving member to a rotary driven member. Such transmission mechanisms are adapted for use in motor vehicles, machine tools, and many other applications.

Heretofore the usual type of gear train designed to serve the purpose of transmitting any of a multiple of speeds from a single input speed rate has been through the use of sliding gears, generally gears which are suitably splined on shafts in an arrangement whereby each gear can be engaged with its mating gear by sliding in and out of mesh, and the gears serve not only for transmitting the drive but also as a clutching means. However, this type of transmission mechanism although it is and has been commonly used in the automotive and the machine tool fields, is subject to criticisms because of the need for hardened and ground spline shafts, shafts which have multiple splines for a driving connection and relation with the gears. Such a connection is necessarily relatively expensive. Also, such a relation between the gear and the shaft does not provide as ideal and good axis for the gear to rotate upon as would be the case of a gear registering on a shaft where the relation between the gear and the shaft was a true round bearing. Such round bearings can be fitted much closer and thereby provide a better base for the accurate rotation of the pitch line of the gear. Furthermore, sliding gear transmissions have necessarily used spur gears, that is gears which have the teeth parallel to the axis of the gear. Such gears are inherently liable to become noisy; and to promote quiet running it is necessary to employ very specialized controls of accuracy. Furthermore, where the sliding gear is used as a clutch, the ends of the teeth must be rounded so that easy engagement is effected when sliding it into and out of mesh. Also, these gears must necessarily be made very hard and of a material capable of withstanding great shocks because any carelessness on the part of the operator shifting from one speed to another, or any imperfections in design or manufacture of the shifting mechanism, may result in the gears being brought into engagement at different relative speeds and this might result in such clashing of the gears as to cause considerable damage even though the gears are hardened. Because such gears are subject to this violent clutching duty is is difficult to keep a spur gear transmission of this type running smoothly and quietly. Quiet operation is an indication of accuracy, smoothness and highly efficient operation. Another criticism of sliding gear transmissions is the relatively great amount of space required in the gear box to provide for shifting from each gear connection to a position of full clearance, then to another, and so on according to the number of sliding gears required. This condition brings about special attention on the part of engineers to carefully compute the minimum width of gears for any given duty or capacity in order that the length of the shafts may be kept at a minimum. Even under these conditions there usually prevails excessive distances between the bearings on a shaft, thus introducing at times a condition of shaft displacement which is detrimental to good gear operation. These conditions impose relatively large cost of manufacture and necessitate the observance of special controls in the metallurgy, hardening and finishing of these spur gears and to take care of distortions which invariably occur during the required heat treating processes.

Another type of transmission mechanism employs helical gears with teeth having a spiral relation to the gear axis. Spiral gear drives are much smoother than spur gears and when properly designed they have much greater power capacity. However, spiral gears have been used to a limited degree because they introduce heavy end thrust problems and their application has been attended with relatively high cost and complex designs, particularly since each gear had to be individually journaled for radial and end thrust.

The present invention contemplates a new principle in change-speed gear transmissions whereby to eliminate the criticisms of prior constructions and to produce certain new results which I have found to be of great utility in this field.

Generally described, my invention contemplates a transmission employing spiral gears always in mesh and journaled so as not to require spline shafts but having round and true precision bearing support, the gears and shafts being journaled for both axial and radial thrust within minimum length requirements, and the gears being clutched and declutched one with respect to another or to the shaft elements by means of novel clutch teeth which have faces generated on a helix of the same lead as the spiral of the gear so that when they are engaged whether driving in one direction or the other the generated faces of the clutch transmit the end forces of the gear, neutralizing them into the clutch so that the bearings on the shafts provide the end thrust as well as the radial load for all of the gears and clutches on the shaft on which they are mounted. These features in combination as more fully described hereinafter produce new results in design possibilities, manufacturing costs, and efficiencies in operation.

In furtherance of this general object my invention contemplates the provision of a combined novel spiral gear transmission mechanism, a novel gear-clutch unit, a novel method of making such a clutch, and a novel machine for making such clutch.

Another object of this invention is to provide a novel power transmission mechanism which includes a helical gear drive and a novel helical face clutch arrangement in the drive for neutralizing end thrusts on helical gears in either direction of the drive.

Another object of this invention is to provide in a multiple speed helical gear drive a novel helical gear-clutch unit in which the clutch portion of the unit is provided with axially extending face clutch teeth of helical configuration having a lead equal to the lead of the helical gear teeth of the unit and generated at right angles to the axis of the gear.

It is also an object of this invention to provide a novel method of making a clutch member having helical face clutch teeth.

Likewise, it is an object of this invention to provide a novel machine for making a clutch member having helical face clutch teeth.

Another object of this invention is to provide a novel variable speed drive which is positive in its action, which is smoother running and quieter in its operation than conventional drives of this type, and in which the space requirements of the transmission are minimized for the amount of power transmitted.

A further object of this invention is to provide a novel variable speed drive in which the gears of the drive are continually in mesh.

It is also a specific object of this invention to provide a novel variable speed drive for the spindle of a machine tool in which the final gears in the drive are mounted directly on the spindle and are as large as possible under these conditions, in which the largest increments of speed change are taken up away from the spindle, and in which the gears meshing with the spindle gears are as small as possible for maximum power transmission to the spindle.

Still another object of this invention is to provide a novel variable speed drive for the spindle of a machine tool having a novel arrangement insuring against driving any of the gears in the transmission at excessive speed.

A further object of this invention is the provision of a novel variable speed drive for the spindle of a machine tool having a plurality of gears adapted to be selectively driven from the shaft on which they are mounted or to idle thereon, in which the change of speed of the gears when shifted between idling and driving conditions is minimized, and in which the relative speed of rotation of the shaft and the gears idling thereon is minimized.

Other and further objects and advantages of the present invention will be apparent from the following description of one embodiment thereof which is applied to a machine tool, this embodiment of the invention being shown in the accompanying drawings as applied to this specific purpose in order to illustrate the principles and mode of operation of this invention.

In the drawings:

Fig. 3 is a view of the Fig. 2 helical gear-clutch unit and illustrating the respective leads of the gear and clutch teeth on this unit;

Fig. 4 is an enlarged view of a portion of the Fig. 1 transmission and illustrating the end thrust neutralizing action of the helical clutch in the transmission;

Fig. 5 is an enlargement illustrating the tangential tooth load exerted by the driven gear against the driving gear in the Fig. 4 mechanism;

Fig. 10 shows the clutch pointing machine for performing the clutch pointing operation on the clutch blank;

Fig. 11 is a view of the clutch generating machine for performing the rough milling and shaping operations on the clutch blank;

Figure 1:
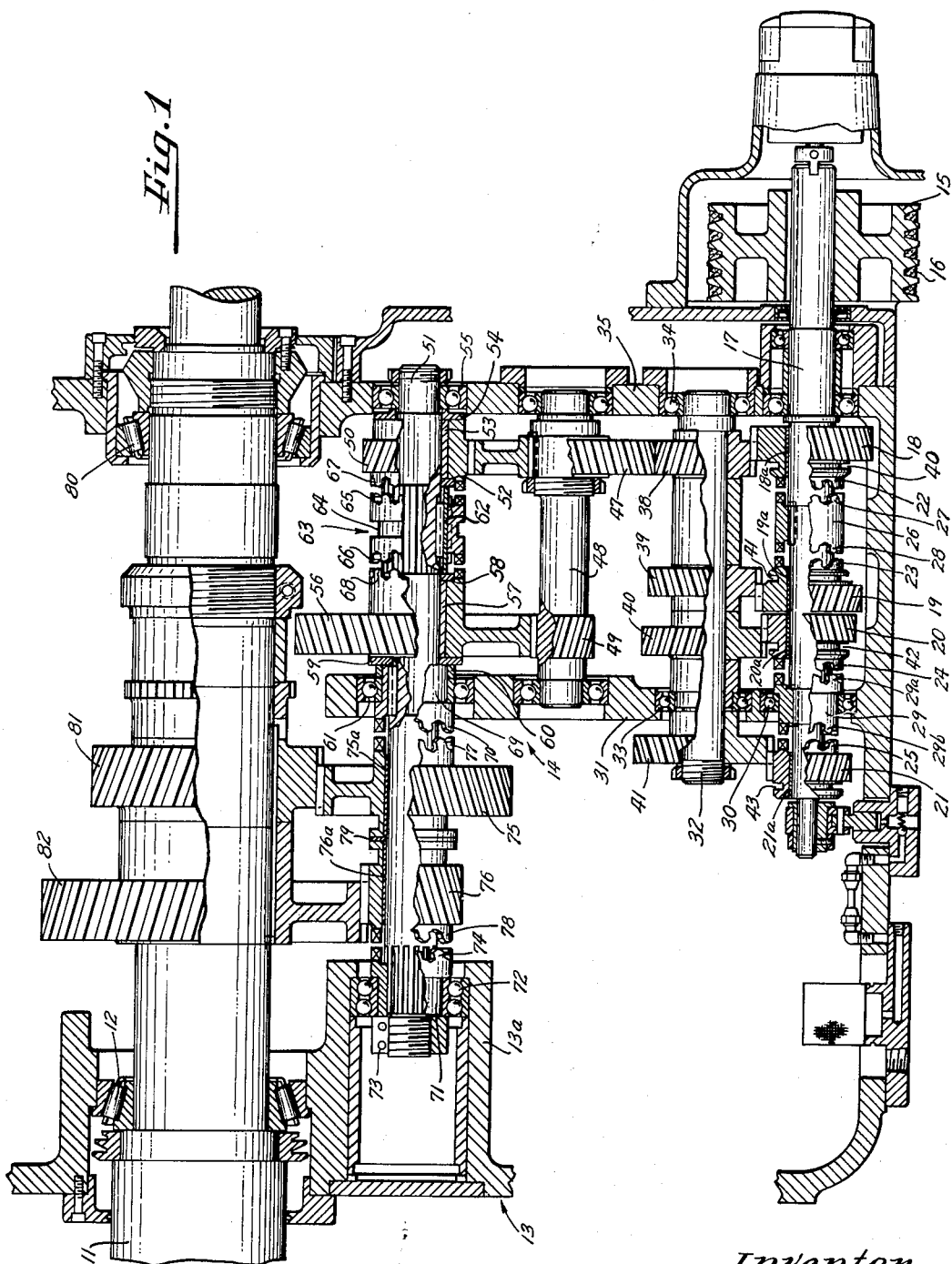
Figure 1 is a longitudinal section through the variable speed drive of the present invention for driving the spindle of a machine tool at any one of a plurality of speeds.

Fig. 12 is a fragmentary top view of a portion of the Fig. 11 mechanism and showing the arrangement for turning the clutch blank as it is moved longitudinally to impart to it a composite longitudinal and turning movement during the rough milling and shaping operations; and Fig. 13 is a view illustrating the positions of the milling cutter and the shaping tools with respect to the clutch blank during the rough milling and shaping operations.

In the following description and in the accompanying drawings, the novel features of the present invention are disclosed in connection with a transmission for a machine tool. However, it is to be realized that the present invention may readily be adapted to either types of transmissions, such as automotive transmissions. Therefore, it is to be understood that the illustrated application of the invention is merely illustrative of one use to which the invention may be put and is not to be construed as restricting the present invention to this particular use, since the broad general utility of the present invention will be readily apparent from the following description.

In conventional variable speed transmissions, particularly those for machine tools, it is common practice to employ spur gears which are selectively shifted into and out of mesh with adjacent gears for obtaining the desired speed of rotation of the spindle from the driving motor. Such transmission systems require that the gear teeth be pointed to facilitate their engagement and that the gear teeth be hardened so as to withstand the shock of clashing engagement when moved into mesh. These requirements introduce a substantial increase in the cost of the gears, due to the additional finishing process needed. Also, after a time the accuracy and quietness of such transmission systems, in which the gears serve as their own clutching means, suffer the results of the violence of the gear tooth engagement, whether the gears are shifted automatically or manually, and in the case of manual operation require extremely skillful handling by the operator in order to reduce to a minimum the violence of the engagement. With spur gear transmissions of this type it commonly happens that the gears subjected to frequent engagements have chewed one another badly, in spite of their hardness, and hardened bits of steel from the gears get into the lubricating system for the gears and damage the anti-friction bearings therein.

The foregoing disadvantages are avoided in the present invention by the provision of a transmission in which the gears remain in constant mesh for all speeds of rotation of the spindle. The transmission of the present invention includes helical gears which are selectively coupled to their respective drive shafts by means of clutches which also serve to neutralize the axial thrust on the helical gears. The helical gear drive of the present invention is particularly advantageous because of the inherently smoother drive resulting from the use of helical gears and because of the greater power transmitting capacity of helical gears as compared with spur gears of the same size.

FIG. 1 TRANSMISSION

Referring to the drawings, there is shown in Fig. 1 the rotary spindle 11 of a machine tool mounted at the bearings 12 and 80 for rotation with respect to the casing 13. A variable speed drive, indicated generally at 14, connects the spindle to a prime mover, such as electric motor 10, for driving the spindle at the desired speed.

The sprocket wheel 15 is driven by a belt 16, which in turn is driven by the prime mover, and is keyed to a first driving shaft 17 for rotating the latter at a predetermined speed. The driving shaft 17 is suitably rotatably journaled in the casing and supports a plurality of helical gear-clutch units, here shown as four in number, which are rotatably mounted on shaft 17. The helical gear-clutch units 18—22, 19—23, 20—24 and 21—25 are mounted on bearing bushings 18a, 19a, 20a and 21a, which are slidable along the drive shaft 17. Formed integral with the respective helical gears 18, 19, 20 and 21 of the gear-clutch units are axially offset clutch members 22, 23, 24 and 25, respectively, which have generally axially extending helical sets of face clutch teeth, respectively. The specific configuration of these face clutch teeth and their relation to the helical gear teeth will be pointed out in detail hereinafter. Fixed on the driving shaft 17 is a clutch member 26 disposed between the gear-clutch units 18—22 and 19—23 and formed at opposite ends with sets of helically disposed face clutch teeth 27, 28, shaped complementary to the helical clutch teeth of the adjacent clutch members 22 and 23, respectively, for engagement therewith. A similar clutch member 29 is keyed to the driving shaft 17 and is disposed between the gear-clutch units 20—24 and 21—25. At its opposite ends the clutch member 29 carries helical face clutch teeth 29a and 29b shaped complementary to the clutch teeth of the adjacent clutch members 24 and 25, respectively, for engagement therewith. Ball bearings 30, interposed between the clutch member 29 and an intermediate upstanding wall 31 of the casing, support the clutch member 29 and driving shaft 17 for rotation relative to the casing.

A driven shaft 32 is rotatably supported by bearings 33 and 34, positioned respectively at the intermediate upstanding casing wall 31 and another upstanding wall 35 adjacent the rear end of the casing. Four helical gears 36, 37, 38 and 39 are fixed to the driven shaft 32 and are positioned to mesh respectively with the gears 18, 19, 20 and 21 on the driving shaft 17.

For selectively controlling the driving connection between the driving shaft 17 and the gear-clutch units 18—22, 19—23, 20—24 and 21—25, these gear-clutch units are provided with reduced neck portions 40, 41, 42 and 43, respectively, for the reception of shifters (not shown) for displacing the gears axially along shaft 17 into and out of clutching engagement with the clutch members 26 and 29. All of these gear-clutch units are shown in Fig. 1 in their respective idling positions so as to be disconnected from driving relation with the drive shaft 17. When the gear-clutch unit 18—22 is shifted to the left in Fig. 1, its clutch 22 moves into mesh with the adjacent complementary clutch teeth 27 on the clutch member 26, which is rotating in unison with the drive shaft 17. When the gear-clutch unit 18—22 is in its idling position (Fig. 1) its gear 18 meshes with the gear 38 across only part of the width of the gear teeth, but these gears are never fully disengaged. When the gear-clutch unit 18—22 is shifted from its idling position (Fig. 1) to the left axially along the shaft 17, its gear teeth move fully into mesh with the gear teeth on the gear 38. The impact due to the effecting of driving engagement from the drive shaft 17 to the gear 38 on the driven shaft 32 is taken up by all of the clutch teeth 22 integral with the gear 18 (in the present instance there being eight such clutch teeth), rather than being imparted to only two or three more rapidly moving gear teeth on the gear 18, as in the case of spur gears shifted from complete disengagement into full engagement with the gear on the driven shaft. With the present clutching arrangement, the surface feet per minute at the point of engagement is greatly reduced and the shape of the clutch teeth is such as to adequately handle the shifting engagement function without substantial shock to the transmission.

Alternately, in like manner, the gear-clutch unit 19—23 may be shifted to the right from the idling position of Fig. 1 to bring its clutch 23 into engagement with the complementary clutch teeth 28 on the clutch member 26 rotating with the drive shaft 17. This movement of the gear-clutch unit 19—23 causes its gear teeth to slide easily into full mesh with the teeth on gear 39 on the driven shaft 32, to drive the shaft 32 from the shaft 17. Likewise, either of the gear-clutch units 20—24 and 21—25 may be selectively shifted into driving relation with the driving shaft 17 for driving the shaft 32 therefrom at the desired speed. Obviously, the choice of which particular gear-clutch unit shall be in driving relation with the driving shaft 17 determines the speed at which the shaft 32 is driven. Thus, four different increments of speed change from the driving shaft 17 to the driven shaft 32 are provided by the selectively shiftable gear-clutch units. When any one of the desired gear-clutch units is in driving relation with shaft 17, the gear on shaft 32 which it drives exerts a tangential tooth load having an end thrust component, due to the helical configuration of the meshing gear teeth, tending to displace that gear-clutch unit axially along the shaft 17. In past transmissions having shiftable helical gears, this factor of end thrust on the shiftable gears has of necessity special end thrust bearing arrangements of substantial size and expanse. However, in the present transmission the helical clutches, by which the drive is transmitted from shaft 17 to a particular one of the gear-clutch units, neutralize these end thrusts in either direction of the drive so that no special end thrust bearings are required. This end-thrust neutralizing function of the helical clutches is effected due to the fact that the lead of the helical clutch teeth equals the lead of the helical gear teeth on each of the shiftable gear-clutch units on shaft 17, as described in greater detail hereinafter.

The gear 38 in the Fig. 1 transmission is carried on the driven shaft 32 and meshes with a large gear 47 keyed to an idler shaft 48. The idler shaft is suitably journaled in the upstanding walls 31 and 35 for rotation therebetween and carries a smaller gear 49, also formed with helical gear teeth, adjacent its end journaled in the wall 31.

The large idler gear 47 meshes with the gear 50 of a first gear-clutch unit 50—67 carried on a bearing bushing 53 rotatably mounted on a splined shaft 51. The position of the first gear-clutch unit 50—67 axially along the splined shaft 51 is fixed by a collar 52, abutting against one end of the bearing bushing 53, and the end thrust collar 54, which is disposed between the other end of bushing 53 and the ball bearing assembly 55 positioned in the upstanding casing wall 35 for supporting the splined shaft 51 for rotation.

The small idler gear 49 meshes with the gear 56 of a second gear-clutch unit 56—68 on the splined shaft 51. The second gear-clutch unit 56—68 is carried by a bearing bushing 57 to be freely rotatable relative to the splined shaft 51. The second gear-clutch unit 56—68 is fixed axially along the splined shaft 51 by means of a collar 58, abutting against one end of the bushing 57, and an end thrust collar 59 interposed between the other end of the bushing 57 and a tubular fitting 60 which abuts against a ball bearing assembly 61 carried in the intermediate upstanding casing wall 31.

A bearing bushing 62 is splined to the shaft 51 and is positioned between the collars 52 and 58. On its outer cylindrical surface the bushing 62 is splined longitudinally and the shiftable clutch member 63 is keyed thereto to be axially slidable along the bushing 62 and to rotate in unison therewith. The clutch member 63 is formed with a reduced neck 64 for the reception of a shifter (not shown). At its opposite axial ends the clutch member 63 is formed with sets of straight clutch teeth 65 and 66, adapted to engage complementary straight clutch teeth 67 and 68, formed integral with the respective gears 50 and 56 and offset axially therefrom.

Fig. 1 shows the clutch member 63 in its neutral position, with no driving connection from the idler shaft 48 to the splined shaft 51. When the clutch member 63 is shifted axially to the right in Fig. 1, the clutch teeth 65 interlock with the clutch teeth 67 attached to the gear 50, to establish a driving connection from the idler shaft 48 through the gears 47 and 50 and clutch 63 to the splined shaft 51. Alternatively, when the clutch member 63 is shifted axially to the left in Fig. 1, the clutch teeth 66 interlock with the clutch teeth 68 attached to the gear 56, to establish a driving connection from the idler shaft 48 through the gears 49 and 56 and clutch 63 to the splined shaft 51. Thus, the clutch 63 provides a pair of sets of speed changes for the splined shaft 51.

The clutch member 63 and the corresponding clutch faces on the gear members 50 and 56 are straight toothed, the end thrust on the helical gears 50 and 56 being taken up by the end thrust collars 54, 52, 58 and 59, 60. Each of the gears 50 and 56 either idles on the shaft 51 or rotates therewith, and the ordinary thrust bearings provided therewith are sufficient for taking up the end thrusts since the gears 50 and 56 do not carry a power load. The straight toothed clutch provision for the gears 50 and 56 completely eliminates any variance in the speed of the shaft 51, particularly in the high speed setting. When idling, either of the gears 50, 56 rotates at a speed relative its associated thrust bearings which is only the difference between the speeds of rotation of the gears 50 and 56. Thus, when the smaller gear 50 is in driving relation with the shaft 51 to drive the latter at high speed, the larger gear 56, driven by the small idler gear 49, is rotating at its normal low speed. This provision of the straight toothed clutch for controlling the large increment speed change is particularly advantageous to avoid impractical speed up conditions in a transmission having all of the gears in constant mesh.

At the intermediate upstanding casing wall 31 there is provided a clutch member 69 disposed between the ball bearings 61 and the shaft 51 and keyed to the shaft 51 to rotate therewith. At one end this clutch member extends snugly through the tubular fitting 60 and is formed with a flat annular end face abutting against the thrust collar 59. At its other end the clutch member 69 is formed with an enlarged head having a plurality of helical face clutch teeth 70.

The forward end of the splined shaft 51 is journaled in a sleeve 13a formed integral with the forward wall of the casing 13 and extending rearwardly therefrom. A clutch member 71 is keyed to the forward end of the splined shaft 51 to rotate therewith, and a ball bearing assembly 72 is interposed between the clutch 71 and the sleeve 13a. At its forward end the clutch 71 abuts against a lock nut 73 carried on the threaded forward end of the shaft 51, while at its opposite end the clutch 71 is formed with a plurality of helical face clutch teeth 74.

Between the clutch members 69 and 71 the shaft 51 is formed with a smooth peripheral surface, at which the helical gear-clutch units 75—77 and 76—78 are carried on separate bearing bushings 75a and 76a rotatable on shaft 51 independent of one another. The gear-clutch unit 75—77 includes a gear 75 and a clutch offset axially in the direction of the clutch member 69 and formed with helical face clutch teeth 77 shaped complementary to, and adapted to interlock with, the clutch teeth 70 on the clutch member 69. The other helical gear-clutch unit 76—78 includes a gear 76 and a clutch offset axially in the direction of the clutch member 71 and formed with helical clutch teeth 78 shaped complementary to, and adapted to interlock with, the clutch teeth 74 on the clutch member 71. A flat annular collar 79 is disposed between the separate gear-clutch units 75—77 and 76—78. While these gears are independently journaled on the shaft 51, their respective axial positions along the shaft are determined by a unitary shifter (not shown) such that they are shifted axially in unison.

Fig. 1 illustrates the neutral position of the gear-clutch units 75—77 and 76—78 axially along the shaft 51, at which position these gear-clutch units idle on this shaft. When shifted to the right in Fig. 1, the clutch teeth 77 move into interlocking relation with the clutch teeth 70 on the clutch member 69 rotating with the shaft 51, and the gear 75 is thereby driven by the shaft 51. In this axial position of the gear-clutch unit 75—77, the other gear-clutch unit 76—78 is maintained out of engagement with the other clutch member 71. When shifted to the left in Fig. 1, the clutch teeth 78 on the gear-clutch unit 76—78 move into interlocking relation with the clutch teeth 74 on the clutch member 71, and the gear 76 is thereby driven by the shaft 51. Thus, the gears 75 and 76 selectively and alternatively may be driven by the shaft 51.

The spindle 11 is suitably journaled for rotation at the bearings 12 positioned adjacent the front of the casing 13 and at the bearings 80 located at the rear of the casing. Rigidly connected to the spindle are a first helical gear 81, positioned and shaped to mesh with the helical gear 75, and a second helical gear 82, positioned and shaped to mesh with the helical gear 76. The speed of rotation of the spindle is thus determined by which of the gears 75 and 76 is clutched to the shaft 51. In all axial positions of the gears 75 and 76 they are always in mesh with the respective spindle gears 81 and 82.

Preferably the spindle gears 81 and 82 are made as large as possible for a more efficient drive thereto, while the gears 75 and 76 which drive the spindle gears are preferably made as small as possible in order to obtain the greatest power in the drive to the spindle gears.

It will be noted that in the Fig. 1 transmission the spindle gears are solid on the spindle and the various clutches are away from the spindle, thereby minimizing backlash.

In addition the largest increments of speed change are effected at the gears 47, 50 and 49, 56, rather than at the spindle itself. As described in greater detail in my copending application Serial No. 305,387, filed August 20, 1952, the shifting arrangement for the shiftable helical gear-clutch units in the transmission is such that at the highest range of speeds the gear 75 is driven from shaft 51 and in turn drives the spindle gear 81. This means that the small gear 76 on shaft 51 is driven by the spindle gear 82 for rotation relative to the rotating shaft 51 on which it is mounted at a speed determined by the difference between the speeds of rotation of the spindle 81 and 51 and the difference between the pitch line velocities of the spindle gears 81 and 82.

*Helical clutch arrangement for neutralizing end thrust in helical gears*

The helical configuration of the gear teeth on the helical gear members in the above-described transmission introduces substantial axial end thrusts on the shiftable gear-clutch units as is well known to those skilled in the art. This problem of end thrust in helical gear transmissions has heretofore militated against the use of such transmissions because in prior transmissions of this type special end thrust bearings have been required. These special bearings have been a substantial cost factor in such transmissions, and, in addition, have resulted in increasing the size of the housing for the transmission by as much as thirty per cent. In accordance with the present invention the requirement for special end thrust bearings and the disadvantages attendant thereto are avoided by shaping the clutch teeth on the helical gear-clutch units so that these clutch teeth interact with the mating fixed helical-toothed clutches to neutralize the axial thrusts on the helical gears in either direction of rotation thereof.

Figure 2:
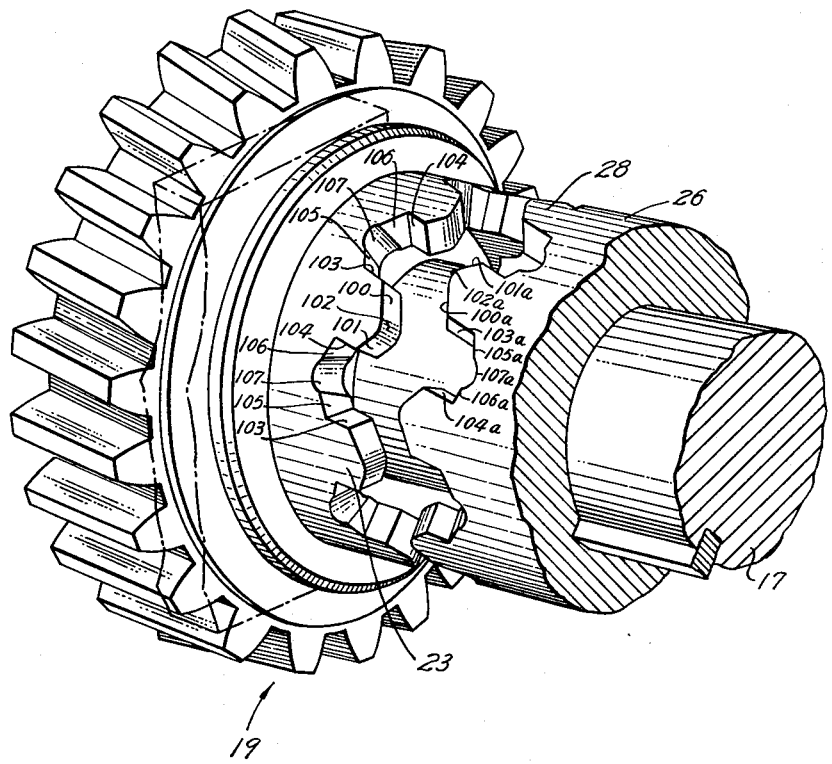
Fig. 2 is an enlarged perspective view of one of the helical gear-clutch units and the mating clutch member in the Fig. 1 transmission.
Figure 6:
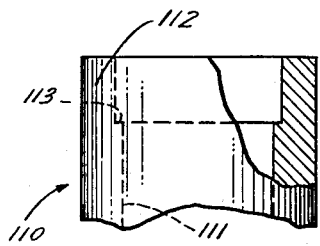
Fig. 6 is a fragmentary view, partly broken away, showing a clutch blank from which is made each helical clutch in the Fig. 1 transmission.

In Fig. 2 are shown in enlarged perspective the shiftable helical gear-clutch unit 19—23 of the Fig. 1 transmission and a portion of the adjacent stationary clutch member 26 to illustrate the principles of construction applicable to the other helical gear-clutch units in the transmission. The teeth of the face clutch portion 23 of the gear-clutch unit 19—23 are inclined helically in the same general direction of twist as the gear teeth on gear 19, but not at the same helix angle, as discussed in detail hereinafter. Each of these teeth is formed with forward faces 100 and 101 which extend rearwardly at opposite sides of a relatively blunt forward nose 102. A generated side face 103 extends angularly rearward from the rear edge of the forward face 100, while a generated side face 104 extends rearward from the rear edge of the other forward face 101. These side faces of the clutch teeth lie respectively in planes passing through the axis of the gear-clutch unit 19—23 but tilted with respect to said axis. Flat rear faces 105 and 106 extend respectively laterally from the rear edges of the side faces 103 and 104. Rounded cut-away recessed portions 107 interconnect the rear edges of adjacent rear faces 105, 106. On the fixed clutch member 26, the clutch teeth 28 are identical in configuration to the described clutch teeth on the clutch 23, having identical front faces 100a—102a, generated side faces 103a and 104a, and rear faces 105a—107a.

The spacing between the adjacent side faces 103, 104 and 103a, 104a of each clutch is such that the clutch teeth of the clutch 23 are shaped to be freely yet snugly received between the teeth 28 on the clutch member 26. When these clutches are fully in mesh, the respective forward noses 102 and 102a of the clutch teeth are spaced somewhat from the corresponding rounded rear recessed portions 107 and 107a between the adjacent clutch teeth on the other clutch, as shown in Fig. 4. Also, there is a slight spacing of the rear faces 105 on the clutch teeth of clutch 23 away from the front faces 100a on the clutch teeth 28, as well as a slight spacing of the forward faces 100 on the clutch teeth of clutch 23 away from the rear faces 105a on the clutch teeth 28 when the clutches are fully in mesh.

In accordance with the present invention, in order to neutralize the end thrust on the shiftable helical gears, the clutch teeth of each of the clutches integral therewith extend in a direction such that the lead of the clutch teeth is equal to the lead of the gear teeth. This construction insures that the end thrust on the respective helical gear is completely neutralized by an opposing end thrust on the corresponding clutch, and no additional means for taking up the end thrust on the gears is required. Referring to Fig. 3, the helix angle G of the gear teeth on gear 19 is greater than the helix angle C of the clutch teeth on the corresponding clutch 23 integral with the gear 19 and of smaller radius than gear 19. Since the lead of both the gear 19 and the clutch 23 is directly proportional to the radius of the respective member and inversely proportional to the tangent of the respective helix angle (G or C), it follows that, for the leads of the gear 19 and the clutch 23 to be equal these members are proportioned such that the respective tangents of their helix angles are directly proportional to their respective radii.

The tangential tooth load on either the gear 19 or the clutch 23 varies inversely as the radius at which the power is being transmitted. The axial or end thrust may be computed by the following formula:

Thrust load = Tangential tooth load $x$ tangent of helix angle

Thus, if the thrust load on the clutch 23 is to equal and neutralize the thrust load on the gear 19, then the tangent of the helix angle of these respective members must vary directly as the radius thereof (since the tangential tooth load varies inversely as the radius). This last relation holds true only when the respective leads of the helical teeth on gear 19 and of the helical teeth on clutch 23 are equal, as explained above.

Referring to Fig. 4, the arrow 1 indicates the line of action of the power being transmitted to the gear-clutch unit 19—23 from the clutch 26, which is fixed to the drive shaft 17 rotating in the direction indicated. It will be noted that this force is applied from the side faces 103a on the teeth 28 of the clutch 26 to the side faces 103 of the teeth on the clutch 23. Due to the helical disposition of these faces on the meshing clutch teeth, there is imparted to the shiftable gear-clutch unit 19—23 an axial thrust in the direction indicated by the arrow 2, tending to separate the meshing clutch teeth.

With the drive gear 19 thus being rotated in the same direction as the clutch member 26, the driven gear 39 with which it meshes exerts a tangential resistance force in the direction indicated by the arrow 3 in Fig. 5 tending to oppose the rotation of the drive gear 19. This resistance force is the tangential tooth load on the gear 19. Due to the helical configuration of the meshing gear teeth, this tangential tooth load on the gear 19 results in an axial thrust load on the gear-clutch unit 19—23 in the direction indicated by the arrow 4 in Fig. 4, tending to force the shiftable gear-clutch unit 19—23 toward the clutch member 26.

Thus, it will be seen that for this direction of rotation of the drive shaft 17, the fixed clutch member 26 and the fixed driven gear 39 impart opposing axial thrusts to the shiftable gear-clutch unit 19—23. By suitably proportioning the radii and helix angles of the teeth on the gear 19 and the clutch 23 to make their respective leads equal, the end thrust exerted by the fixed clutch member 26 may be made to exactly neutralize the end thrust on the drive gear 19.

In the opposite direction of rotation of the drive shaft 17, each of the forces indicated by the arrows 1—4 in Figs. 4 and 5 is reversed, with the result that the end thrust exerted by the fixed clutch 26 opposes the end thrust on the gear 19 due to the tangential tooth load on this gear. In this opposite direction of rotation, the power is transmitted from the fixed clutch 26 to the shiftable gear-clutch unit 19—23 at the faces 104a and 104 on the meshing clutch teeth, with the helical disposition of these faces causing an end thrust to be imparted to the gear-clutch unit 19—23 tending to force it toward the fixed clutch 26. However, the tangential tooth load on the gear 19 results in an end thrust in the opposite direction.

The foregoing actions also take place in the same manner at each of the other shiftable helical gear-clutch units 18—22, 20—24, 21—25, 75—77 and 76—78 in the Fig. 1 transmission when each of these gear-clutch units is connected in the drive. In each of these helical gear-clutch units the lead of the clutch teeth equals the lead of the gear teeth and the end thrust on the gear is neutralized by the action of the corresponding clutch.

*Cutting of helical clutch teeth on clutch members*

In forming the helical face clutch teeth on the various clutch members in the Fig. 1 transmission, the steps shown in Figs. 6–9 are performed by the respective clutch pointing and clutch generating machines shown in Figs. 10–12. The generally cylindrical clutch blank 110 (Fig. 6) is formed with an axial bore 111 for passing the shaft on which the finished clutch is to be mounted. At its outer axial end the clutch blank is formed with an annular end portion 112 of lesser thickness, an internal annular transverse shoulder 113 being provided at the juncture of this end portion 112 with the middle portion of the clutch blank.

Figure 7:
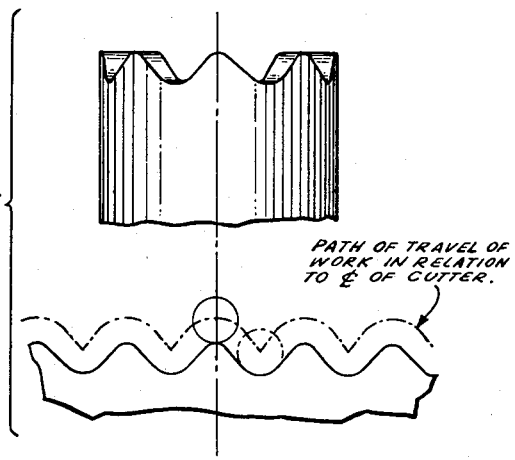
Fig. 7 shows the clutch blank after the clutch points have been formed and the manner in which these clutch points are formed.

The first step in forming the clutch teeth is to mill eight evenly spaced clutch points on the end portion 112 of the clutch blank, to produce the partially machined clutch blank shown in Fig. 7. For this operation there is provided the clutch pointing machine shown in Fig. 10.

Referring to Fig. 10, there is shown a base 102 which supports a slide 121 at its upper face. A bracket 122 mounted on the slide supports a spindle head 123. The latter supports for rotation a spindle 124 which carries a milling cutter 125. The spindle head 123 is pivotally connected to its support bracket 122 by means of a bolt 126. An adjustable clamping bolt 127 mounted on the spindle head extends through an arcuate slot 128 formed in the bracket 122. By loosening the clamping bolt 127, the spindle head 123 may be adjusted to any desired angular position about its pivot bolt 126 within the limits defined by the slot 128. A spindle motor 129 mounted on the spindle head is connected by a pulley drive 130 for driving the spindle 125 for rotation. By means of a conventional drive from the hand wheel 131 the slide 121 may be shifted either to the right or left in Fig. 10.

The base 120 also supports a feed motor 132 which, through a pulley drive 133, drives a worm 134. The worm 134 drives a worm wheel 135 mounted on the same shaft 136 as a pinion 137 which, through an idler gear 138, drives a gear 139. Gear 139 is carried by a shaft 140, which is rotatably supported by means of bearings 141 on a work head 142 mounted for limited reciprocation along the top of the base 120. The mounting of shaft 140 at the bearings 141 is such that the work head 142 is caused to reciprocate longitudinally in unison with shaft 140, while at the same time permitting the free rotation of shaft 140. A compression coil spring 143 acting between an annular collar 144 fixed to the base 120 and an annular collar 145 attached to the work head 142 biases the work head 142 to the right in Fig. 10. A cam 146 attached to the outer end of shaft 140 engages a roller 147 mounted on the end of the base 120. With this arrangement, for each rotation of shaft 140 the consequent turning of cam 146 causes the work head 142 to be reciprocated once.

At its inner end, shaft 140 carries a gear 148 which drives a compound reduction gear 149, which in turn drives the work spindle gear 150. Gear 150 is connected to the rotary spindle 151, which is mounted for rotation on the work head 142 and which supports the clutch blank 110 with the outer end 112 of the latter positioned to be engaged by the milling cutter 125. The reduction through the gearing 140—150 is at a ratio of one to eight, so that for each rotation of shaft 140 (which results in a complete reciprocation of the work head 142 and thus a complete reciprocation of the clutch blank 110) the clutch blank 110 is turned one-eighth of a turn. Thus, eight revolutions of the shaft 140 result in the completion of eight evenly spaced clutch points on the clutch blank, to provide a clutch blank having the configuration shown in Fig. 7.

The drive from hand wheel 131 permits the milling cutter to be retracted away from the finished clutch blank at the completion of the clutch pointing operation to facilitate unloading of the finished blank from the work spindle 151 and loading of the next clutch blank onto this spindle.

It will be noted from Fig. 7 that, after the clutch blank points have been milled on the clutch blank, these clutch points are evenly spaced and are of asymmetrical configuration to present an outer face having the outer face surfaces 100—102 or 100a—102a of the finished clutches shown in Fig. 2. Obviously the asymmetrical configuration of the clutch points on the blank of Fig. 7 is determined by the shape of the cam 146 in the clutch-pointing machine of Fig. 10.

The next step in the formation of the helical clutch teeth on the clutch blank is to rough mill the spaces between the clutch points to provide well-defined helically extending clutch teeth. This changes the clutch blank to the configuration shown in Fig. 8.

Figure 9:
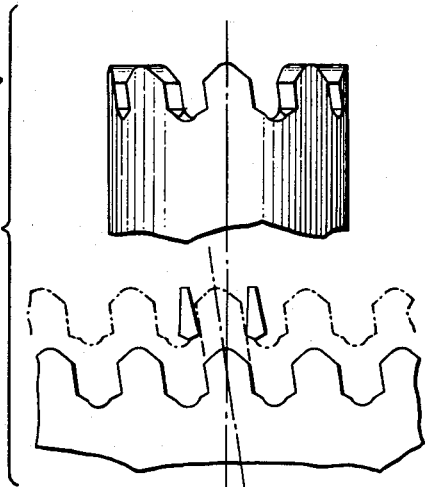
Fig. 9 shows the shaping of the side and bottom faces at the clutch teeth on the clutch blank and the configuration of the clutch blank after this final step in the forming of the helical clutch teeth.

Following this the generated sides of the clutch teeth are cut to finished shape to produce a finished clutch blank having helically extending teeth of the configuration shown in Figs. 2 and 9, and already described in detail in connection with Fig. 2.

These operations are performed successively on the clutch generating machine of Figs. 11 and 12.

Referring to these figures, the clutch generating machine includes a base 153 which supports a feed motor 154. The feed motor through a pulley drive 155 drives a worm 156, which drives a worm wheel 157 mounted on a shaft 158. Shaft 158 carries a pinion 159 which through an idler gear 160 drives a gear 161 carried on a sleeve 162. Sleeve 162 is rotatably mounted on a longitudinally slidable rod 163, the mounting of sleeve 162 on rod 163 being such that they move axially in unison. Rod 163 is attached to the work head 164, which is mounted for limited reciprocation along the top of the base 153. A compression coil spring 165 loosely surrounding the rod 163 acts between the base 153 and the work head 164 to bias the work head to the right in Fig. 1. At its outer end the rotatable sleeve 162 carries a feed cam 166 whose cam face engages a roller 167 mounted on the base 153. As the sleeve 162 is rotated, the cam 166 and the spring 165 cause the work head 164 to be reciprocated, with the cam acting alternately to retract the work head to the left in Fig. 11 against the force of spring 165 and the spring 165 acting to move the work head to the right when the low points on the cam 166 engage the roller 167.

The cam 166 carries on its periphery a trip dog 200 which engages the operating plunger 201 of a switch 202 controlling the energization of the motor 154. The trip dog 200 is mounted to trip the switch 202 and thereby deenergize motor 154 when the work head 164 is in its fully retracted position, away from the milling cutter 184 and the shaping tools 188, 189. Thus, the drive to the work head 164 is automatically interrupted after each full reciprocation of the work head.

A spindle sleeve 168 is rotatably mounted on the work head 164. A work spindle 169 extends through a longitudinal bore in the spindle sleeve and at its outer and supports the clutch blank 110 which has already been formed with clutch points by the mechanism of Fig. 10. At its opposite end, the spindle 169 carries an index plate 170 formed with a plurality of circumferentially spaced recesses for selectively receiving a spring-pressed plunger 171 mounted in a bracket 172 attached to the spindle sleeve 168. By virtue of this connection, the spindle 169 is normally caused to rotate in unison with the spindle sleeve 168. A knob 173 may be manually grasped by the operator to retract the plunger 172 against the force of its associated spring 174 for disconnecting the spindle 169 from the spindle sleeve 168 to permit the spindle to be turned within the spindle sleeve and then to be locked in a different angular position relative thereto.

The spindle sleeve 168 has cut on its periphery gear teeth 175 which engage racks 176 and 177 mounted on the work head 164. The racks 176 and 177 are mounted for reciprocatory movement on the work head transversely of the spindle sleeve 168 (see Fig. 12). At one end the rack 177 carries a roller 179 positioned to engage a cam 180 mounted on the base 1. A compression coil spring 178 acting against the rack 176 through the gear teeth 175 on the spindle sleeve 168 biases the rack 177 to position its roller continually in engagement with the cam 180.

The foregoing mechanism imparts to the clutch blank 110 held by the spindle 169 a combined longitudinal and turning movement in the following manner: As the work head 164 is moved longitudinally under the action of the feed cam 166 and spring 165, as described, the roller 179 on the rack 177 carried by the work head engages the stationary cam 180. The resulting sliding movement of the rack 176 transversely across the work head 164 causes the spindle sleeve 168 to be turned because of the mesh between the teeth on rack 177 and the gear teeth 175 on the spindle sleeve 168. The interlock at 170, 171 between the spindle sleeve 168 and the spindle 169 causes this composite longitudinal and turning movement to be imparted to the spindle, which carries the clutch blank 110.

The base 153 also carries a slide 181 mounted for reciprocation lengthwise along the top of the base. The slide 181 supports a rigid bracket 182 which supports a spindle head 183. The latter supports for rotation a spindle 184 carrying a vertically disposed milling cutter 185. A motor 186 mounted on the support bracket 182 is connected by a belt drive 187 to the spindle 184 for driving the spindle.

There are also provided a pair of motor driven reciprocatory shaping tools 188 and 189 (Fig. 13) positioned to engage teeth at opposite sides of the clutch blank. These shaping tools are mounted for reciprocation along upwardly and radially inwardly inclined ways, one of which is shown at 190 in Fig. 11. These ways are so constructed and arranged that the shapers 188 and 189 are supported for movement upwardly at an angle along a path which is slightly off-center from the axis of the clutch blank, as shown in Fig. 13. The shapers are so disposed that they shape opposite side faces of the respective clutch teeth; thus, shaper 188 is arranged to shape the side faces 104 on clutch 23 in Fig. 2 while shaper 189 is arranged to shape the opposite side faces 103. The specific mechanism for reciprocating the shaping tools 188 and 189 is not shown in detail since any suitable or conventional mechanism for this purpose may be employed.

From the foregoing, it will be obvious that the function of the milling cutter 185 is to rough mill the spaces between the clutch teeth to produce the tooth shape shown in Fig. 7, while the function of the shaping tools 188 and 189 is to shape the respective opposite generated helically extending side faces of the clutch teeth and the flat bottom faces at the valleys between the clutch teeth. It will be noted from Fig. 13 that both the rough milling and shaping operations are performed by tools which extend transversely of the annular clutch blank 110. Thus, the shaping tools in particular are free to have an overtravel (into the central axial passage in the clutch blank) without danger of spoiling the work piece.

In the operation of the clutch generating machine described above, the clutch blank is fed toward the cutting tools with a composite longitudinal and turning movement. The fixedly located rotary milling cutter 185 engages the outer end of the clutch blank at the space between the clutch points, and, due to the turning movement of the clutch blank as it is fed forward, the milling cutter produces a helical cut between the clutch points. When the clutch blank is retracted away from the milling cutter, its drive is disconnected by switch 202, the locking plunger 171 is manually retracted, the index plate 170 attached to the spindle 169 is turned to the next position, and then the locking plunger 171 is released to engage index plate 170 and lock the spindle in this position to position the next space between clutch points on the clutch blank to be engaged by the milling cutter when the clutch blank is next fed forward. In this manner, the spaces between clutch points on the clutch blank are milled out in successive operations to provide helically extending face clutch teeth.

Figure 8:
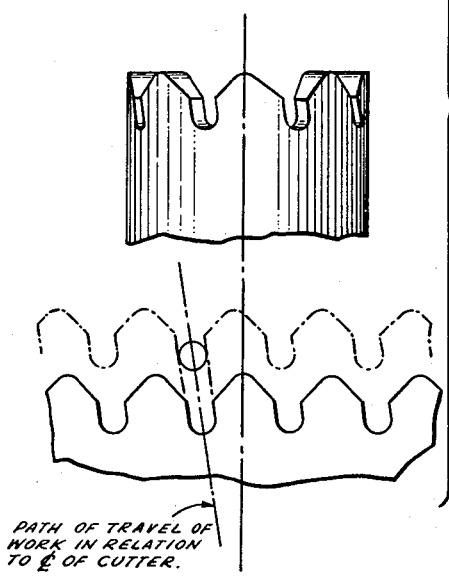
Fig. 8 shows the rough milling of the clutch teeth on the clutch blank and the configuration of the clutch blank after this operation.

Following the completion of the rough milling operations, which have produced a clutch blank as shown in Fig. 8, the drive to the shaping tools 188 and 189 is set into operation. The clutch blank is fed toward and away from the shaping tools with the same composite longitudinal and turning movement and by the same drive mechanism (Fig. 11) as in the rough milling operations. The respective shaping tools engage opposite side faces of oppositely disposed clutch teeth on the clutch blank, as shown in Fig. 13, and shape these side faces and the flat bottom faces at the valleys between the clutch teeth to produce the clutch tooth configuration shown in Fig. 9.

At the end of the shaping operation, the entire cutting tool assembly may be retracted by a suitable drive from the hand wheel 191 to the slide 181. This facilitates the ready removal of the finished clutch blank from the spindle 189 and the mounting of the next clutch blank thereon.

From the foregoing it will be evident that the present invention includes a novel variable speed transmission, a novel helical gear-clutch unit for use in a transmission, a novel method of cutting the helical face clutch teeth on helical clutches, and novel apparatus for cutting helical face clutch teeth on helical clutches.

While in the foregoing specification and in the accompanying drawings there is disclosed a specific preferred embodiment of the present invention, it is to be understood that various modifications, omissions and refinements which depart from the specific disclosed embodiment of the present invention may be adopted without departing from the spirit and scope of my invention.

I claim:

1. In a transmission, the combination of a drive shaft, a shiftable drive gear rotatably mounted on the drive shaft and formed with helically extending gear teeth, a driven gear formed with helically extending gear teeth in mesh with said gear teeth on the drive gear, said driven gear being operative to exert a tangential tooth load on said drive gear when driven thereby and to impart an end thrust in one direction to the drive gear because of the helical configuration of the meshing gear teeth, a first clutch member connected rigidly to said drive gear and formed with helical face clutch teeth extending in the same general direction of twist as the helical gear teeth on the drive gear and having a lead equal to the lead of the gear teeth on the drive gear, and a second clutch member mounted on the drive shaft to rotate therewith and formed with helically extending face clutch teeth shaped to mesh with said clutch teeth on said first clutch member for imparting the drive from the drive shaft to said drive gear for driving the driven gear and for imparting an end thrust to said first clutch member due to the helical configuration of the meshing clutch teeth which neutralizes said end thrust on the drive gear.

2. The combination of claim 1, wherein said clutch teeth on the first clutch member terminate at their ends disposed axially remote from the drive gear in forward nose portions shaped to project axially into the spaces between the clutch teeth on the second clutch member and to be disposed next to the roots at the respective spaces between the clutch teeth on the second clutch member when said clutch members are in mesh, and said clutch teeth on the second clutch member terminate at their ends disposed axially toward the drive gear in forward nose portions shaped to project axially into the spaces between the clutch teeth on the first clutch member and to be disposed next to the roots at the respective spaces between the clutch teeth on the first clutch member when said clutch members are in mesh.

3. In a transmission, the combination of a rotary drive shaft, a drive gear mounted rotatably on said drive shaft and mounted for limited sliding movement therealong, said drive gear having helically extending gear teeth disposed cylindrically about the drive shaft, a driven gear formed with helically extending gear teeth and mounted to mesh with said drive gear in all positions thereof along the drive shaft, said driven gear exerting a tangential tooth load on said drive gear when driven thereby and imparting an end thrust to the drive gear due to the helical configuration of the meshing gear teeth, a first clutch member connected rigidly to the drive gear and formed with a plurality of helically extending face clutch teeth projecting axially away from the drive gear, said clutch teeth having a helical twist in the same direction as the gear teeth on the drive gear and the lead of said clutch teeth being equal to the lead of the gear teeth on the drive gear, a second clutch mounted on the drive shaft for rotation therewith and formed with helically extending face clutch teeth constructed and arranged to mesh with the clutch teeth on the first clutch member in one extreme limit of movement of the drive gear and the first clutch member, said second clutch member when meshing with said first clutch member imparting the drive from the drive shaft to the drive gear for rotating the latter and imparting to said first clutch member due to the helical configuration of the meshing clutch teeth an end thrust in the opposite direction to said end thrust on the drive gear.

4. The combination of claim 3, wherein said clutch teeth on the first clutch member terminate at their ends disposed axially remote from the drive gear in forward nose portions shaped to project axially into the spaces between the clutch teeth on the second clutch member and to be disposed next to the roots at the respective spaces between the clutch teeth on the second clutch member when said clutch members are in mesh, and said clutch teeth on the second clutch member terminate at their ends disposed axially toward the drive gear in forward nose portions shaped to project axially into the spaces between the clutch teeth on the first clutch member and to be disposed next to the roots at the respective spaces between the clutch teeth on the first clutch member when said clutch members are in mesh.

5. In a transmission, the combination of a rotary drive shaft, a drive gear mounted for limited sliding movement along the drive shaft and for relative rotation with respect to the drive shaft, said drive gear having peripheral helically extending gear teeth disposed about the drive shaft, a driven gear formed with helically extending gear teeth meshing with the gear teeth on the drive gear in all positions of the drive gear along the drive shaft, said driven gear exerting a tangential tooth load on the drive gear when driven thereby and imparting an end thrust to the drive gear tending to displace it axially in one direction along the drive shaft due to the helical configuration of the meshing gear teeth, a first clutch member connected rigidly to the drive gear and formed with a plurality of helically extending face clutch teeth spaced away from the gear teeth on the drive gear and disposed cylindrically about the drive shaft and projecting in one axial direction away from the drive gear, said clutch teeth having a helical twist in the same general direction as the gear teeth on the drive gear and the lead of said clutch teeth being equal to the lead of the gear teeth on the drive gear, a second clutch member mounted on the drive shaft in fixed relation axially thereon and for rotation in unison therewith, said second clutch member having helically extending face clutch teeth constructed and arranged to mesh with the clutch teeth on the first clutch member when the drive gear and the first clutch member are shifted toward the second clutch member, said second clutch member when meshing with the first clutch member connecting the drive gear to the drive shaft for driving the drive gear from the drive shaft and imparting to the first clutch member an end thrust which is equal and in the opposite direction to said end thrust on the drive gear.

6. In a transmission, the combination of a rotary drive shaft, a drive gear mounted for limited sliding movement along the drive shaft and for relative rotation with respect to the drive shaft, said drive gear having peripheral helically extending gear teeth disposed about the drive shaft, a driven gear formed with helically extending gear teeth meshing with the gear teeth on the drive gear in all positions of the drive gear along the drive shaft, said driven gear exerting a tangential tooth load on the drive gear when driven thereby and imparting an end thrust to the drive gear tending to displace it axially in one direction along the drive shaft due to the helical configuration of the meshing gear teeth, a first clutch member connected rigidly to the drive gear and formed with a plurality of helically extending face clutch teeth spaced away from the gear teeth on the drive gear and disposed cylindrically about the drive shaft and projecting in one axial direction away from the drive gear, said clutch teeth having a helical twist in the same general direction as the gear teeth on the drive gear and the lead of said clutch being equal to the lead of the gear teeth on the drive gear, a second clutch member including a support portion connected rigidly to the drive shaft for rotation in unison therewith and face clutch teeth projecting axially from one end of the support portion in a direction toward the drive gear and arranged cylindrically about the drive shaft in spaced relation from the drive shaft, said clutch on the second clutch member extending helically and being shaped complementary to the clutch teeth on the first clutch member to mesh therewith when the drive gear and the first clutch member are shifted toward the second clutch member, said second clutch member when meshing with the first clutch member imparting the drive from the drive shaft to the drive gear and imparting to the first clutch member due to the helical configuration of the meshing clutch teeth an end thrust which is equal and opposite to said end thrust on the drive gear.

7. The combination of claim 6, wherein said clutch teeth on the first clutch member terminate at their ends disposed axially remote from the drive gear in forward nose portions shaped to project axially into the spaces between the clutch teeth on the second clutch member and to be disposed next to the roots at the respective spaces between the clutch teeth on the second clutch member when said clutch members are in mesh, and said clutch teeth on the second clutch member terminate at their ends disposed axially toward the drive gear in forward nose portions shaped to propect axially into the spaces between the clutch teeth on the first clutch member and to be disposed next to the roots at the respective spaces between the clutch teeth on the first clutch member when said clutch members are in mesh.

8. In a transmission, the combination of a rotary drive shaft, a drive gear mounted loosely on the drive shaft for limited sliding movement therealong and normally disconnected from driving relation with the drive shaft, said drive gear having peripheral helically extending gear teeth disposed circumferentially about the drive shaft, a driven gear formed with helically extending gear teeth meshing with the gear teeth on the drive gear in all positions of the drive gear along the drive shaft, said driven gear exerting a tangential tooth load on the drive gear when driven thereby and imparting an end thrust to the drive gear tending to displace the drive gear axially in one direction along the drive shaft due to the helical configuration of the meshing gear teeth, a first clutch member connected to the drive shaft for rotation therewith and formed with a plurality of helically extending face clutch teeth projecting axially away from the drive gear and disposed cylindrically about the drive shaft, said clutch teeth having a helical twist in the same direction as the gear teeth on the drive gear and the lead of said clutch teeth being equal to the lead of the gear teeth on the drive gear, a second clutch member including a support portion connected rigidly to the drive shaft for rotation in unison therewith and face clutch teeth projecting axially from one end of the support portion in a direction toward the drive gear and disposed cylindrically about the drive shaft in spaced relation from the drive shaft, said clutch teeth on the second clutch member extending helically and being constructed and arranged to mesh with the clutch teeth on the first clutch member when the drive gear and the first clutch member are shifted along the drive shaft toward the second clutch member, said second clutch member when meshing with the first clutch member imparting the drive from the drive shaft to the drive gear and imparting to the first clutch member due to the helical configuration of the meshing clutch teeth an end thrust which is equal and opposite to said end thrust on the drive gear.

9. A gear-clutch unit, comprising a gear member having helically extending gear teeth, and a face clutch member connected rigidly to said gear member and having a plurality of helical clutch teeth which have the characteristics of having been cut at right angles to the extent of said helical gear teeth, said clutch teeth having a helical twist in the same direction as said gear teeth, the lead of said clutch teeth being equal to the lead of said gear teeth.

10. A gear-clutch unit, comprising a rotatable gear member having gear teeth which extend helically with respect to the axis of the gear, and a clutch member connected rigidly to said gear member and formed with helical face clutch teeth offset axially from the gear member, said clutch teeth having forward nose portions axially remote from the gear member and said clutch teeth extending axially inwardly from their forward nose portions toward the gear member with a helical twist about the axis of the gear member in the same direction as the helical twist of the gear teeth, the lead of the clutch teeth being equal to the lead of the gear teeth.

11. A gear-clutch unit, comprising a gear member having helically extending gear teeth, and a clutch member connected rigidly to said gear member and having a plurality of helically extending face clutch teeth projecting axially outward away from said gear member, said clutch teeth having the characteristics of having been cut at right angles to the extent of said helical gear teeth, said clutch teeth having a helical twist in the same direction as said helical gear teeth, the lead of said gear teeth and the lead of said clutch teeth being equal.

12. A gear-clutch unit, comprising a rotatable gear member having helically extending gear teeth arranged cylindrically about the axis of the gear member, and a face clutch member rigidly connected to said gear member and extending axially therefrom, said clutch member axially remote from the gear member being formed with a smooth cylindrical periphery and a plurality of clutch teeth extending axially outward therefrom in a direction away from the gear member, said clutch teeth having a helical twist in the same direction as the helical twist of said gear teeth and terminating in forward nose portions axially remote from the gear member, the lead of said clutch teeth being equal to the lead of said gear teeth.

13. A gear-clutch unit, comprising a rotatable gear member having helically extending gear teeth, and a face clutch member rigidly connected to said gear member and having a plurality of helical clutch teeth generated in a plane extending at right angles through the axis of the gear member, said clutch teeth having a helical twist in the same direction as the helical twist of said gear teeth, the lead of said clutch teeth being equal to the lead of said gear teeth.

14. In a multiple speed transmission, the combination of a rotary driven member carrying a large gear and a small gear, a rotary shaft, a small gear mounted loosely on said shaft and meshing with said large gear on the driven member, a large gear mounted loosely on said shaft and meshing with said small gear on the driven member, means for selectively imparting different speeds of rotation to the shaft including a low range of speeds and a higher range of speeds, means for selectively coupling to the shaft said small gear mounted thereon for driving the driven member at its lowest range of speeds, and means for selectively coupling to the shaft said large gear mounted thereon for driving the driven member at the next range of speeds above said lowest range, whereby to limit the speed of rotation with respect to the shaft of said small gear mounted thereon at the highest range of speeds of the shaft to a value proportionate to the difference between the speeds of rotation of the driven member and the shaft and the difference between the respective pitch line velocities of the large and small gears on the driven member.

15. In a machine tool, the combination of a spindle, a large gear and a small gear rigid with said spindle, an intermediate shaft, a small gear mounted loosely on said intermediate shaft and meshing with said large spindle gear, a large gear mounted loosely on said intermediate shaft and meshing with said small spindle gear, an input shaft adapted to be connected in driving relation to said intermediate shaft, a plurality of separate drive-transmitting mechanisms operative to selectively establish different speed drives from the input shaft to the intermediate shaft for selectively driving the intermediate shaft at any predetermined one of a plurality of speeds including a low range of speeds and a higher range of speeds, means for selectively coupling to the intermediate shaft said small gear mounted thereon for driving the spindle at its lowest range of speeds, and means for selectively coupling to the intermediate shaft said large gear mounted thereon for driving the spindle at the next range of speeds above said lowest range, whereby to limit the speed of rotation on the intermediate shaft of said small gear mounted thereon to a value proportionate to the difference between the speeds of rotation of the spindle and the intermediate shaft and the difference between the respective pitch line velocities of the large and small spindle gears.

16. In a machine tool, the combination of a rotary spindle, a large gear having helical gear teeth and a smaller gear having helical gear teeth rigid with the spindle, a rotary shaft, a pair of spaced clutch members mounted on said shaft to rotate therewith, each of said clutch members having helically extending face clutch teeth, a first gear-clutch unit mounted loosely on the shaft for limited sliding movement therealong, said first gear-clutch unit including a small gear having helical gear teeth meshing with said helical gear teeth on the large spindle gear in all positions of the first gear-clutch unit along the shaft and a clutch having helically extending face clutch teeth shaped complementary to said clutch teeth on a first one of said clutch members on the shaft for meshing therewith when the first gear-clutch unit is shifted in one direction along the shaft, the lead of said meshing helical clutch teeth on said one clutch member on the shaft and said clutch of the first gear-clutch unit being equal to the lead of said meshing helical gear teeth on the gear of the first gear-clutch unit and said large spindle gear for neutralizing the end thrust on the first gear-clutch unit due to the helical configuration of said meshing gear teeth when the gear of the first gear-clutch unit drives the spindle through said large spindle gear, a second gear-clutch unit mounted loosely on the shaft for limited sliding movement therealong, said second gear-clutch unit including a larger gear having helical gear teeth meshing with said helical gear teeth on the smaller spindle gear in all positions of the second gear-clutch unit along the shaft and a clutch having helically extending face clutch teeth shaped complementary to said clutch teeth on the other of said clutch members on the shaft for meshing therewith when the second gear-clutch unit is shifted in the opposite direction along the shaft, the lead of said meshing helical clutch teeth on said other clutch member on the shaft and said clutch of the second gear-clutch unit being equal to the lead of said meshing helical gear teeth on the gear of the second gear-clutch unit and said smaller spindle gear for neutralizing the end thrust on the second-gear clutch unit due to the helical configuration of said meshing gear teeth when the gear of the second gear-clutch unit drives the spindle through said smaller spindle gear, said first and second gear-clutch units being shiftable in unison along thhe shaft for selectively coupling one or the other to the shaft to selectively effect small increments of speed change in the drive to the spindle by driving the spindle either through said first gear-clutch unit and the large spindle gear or through said second gear-clutch unit and the smaller spindle gear, and means for controlling the drive to the shaft to change the speed of the shaft for effecting large increments of speed change in the drive to the spindle, said smaller spindle gear being larger than the gear of either of said gear-clutch units.

17. The combination of claim 16, wherein there is also provided a rotary drive input shaft, a plurality of spaced clutch members mounted rigidly on said drive shaft and having helically extending face clutch teeth, a plurality of gear-clutch units mounted loosely on the drive shaft for limited sliding movement therealong, each of said gear-clutch units including a gear having helical gear teeth and a clutch having helically extending face clutch teeth shaped complementary to the clutch teeth on the respective adjacent clutch member on the drive shaft for meshing therewith in one extreme limit of movement of the respective gear-clutch unit along the drive shaft, a second shaft carrying gear having helical gear teeth meshing respectively with the helical gear teeth of the gear-clutch units in all positions of the latter along the drive shaft, the lead of the clutch teeth on each of said gear-clutch units and the adjacent clutch member on the drive shaft being equal to the lead of the gear teeth on the respective gear-clutch unit and the corresponding gear on the second shaft for neutralizing the end thrust on the respective gear-clutch unit due to the helical configuration of the meshing gear teeth when driven from the drive shaft, and means providing a driving connection from said second shaft to the shaft on which said first and second gear-clutch units are mounted.

18. In a machine tool, the combination of a rotary spindle, a large gear having helical gear teeth and a smaller gear having helical gear teeth rigid with the spindle, a rotary intermediate shaft, a pair of spaced clutch members mounted on the intermediate shaft to rotate therewith, each of said clutch members having helically extending face clutch teeth, a first gear-clutch unit mounted loosely on the intermediate shaft for limited sliding movement therealong, said first gear-clutch unit including a small gear having helical gear teeth meshing with said helical gear teeth on the large spindle gear in all positions of the first gear-clutch unit along the intermediate shaft and a clutch having helically extending face clutch teeth shaped complementary to said clutch teeth on a first one of said clutch members on the intermediate shaft for meshing therewith when the first gear-clutch unit is shifted in one direction along the intermediate shaft, the lead of said meshing helical clutch teeth on said one clutch member on the intermediate shaft and said clutch of the first gear-clutch unit being equal to the lead of said meshing helical gear teeth on the gear of the first gear-clutch unit and said large spindle gear for neutralizing the end thrust on the first gear-clutch unit due to the helical configuration of said meshing gear teeth when the gear of the first gear-clutch unit drives the spindle through said large spindle gear, a second gear-clutch unit mounted loosely on the intermediate shaft for limited sliding movement therealong, said second gear-clutch unit including a larger gear having helical gear teeth meshing with said helical gear teeth on the smaller spindle gear in all positions of the second gear-clutch unit along the intermediate shaft and a clutch having helically extending face clutch teeth shaped complementary to said clutch teeth on the other of said clutch members on the intermediate shaft for meshing therewith when the second gear-clutch unit is shifted in the opposite direction along the intermediate shaft, the lead of said meshing helical clutch teeth on said other clutch member on the intermediate shaft and said clutch of the second gear-clutch unit being equal to the lead of said meshing helical gear teeth on the gear of the second gear-clutch unit and said smaller spindle gear for neutralizing the end thrust on the second-gear clutch unit due to the helical configuration of said meshing gear teeth when the gear of the second gear-clutch unit drives the spindle through said smaller spindle gear, an input shaft adapted to be connected in driving relation to said intermediate shaft, a plurality of separate drive-transmitting mechanisms operative to selectively establish different speed drives from the input shaft to the intermediate shaft for selectively driving the intermediate shaft at any predetermined one of a plurality of speeds, and said first and second gear-clutch units being shiftable in unison along the intermediate shaft for selectively clutching one or the other to the intermediate shaft to selectively drive the spindle at its lowest range of speeds and at a higher intermediate range of speeds through the first gear-clutch unit and said large spindle gear at all speeds of the intermediate shaft and to selectively drive the spindle at the next range of speeds above said lowest range and at its highest range of speeds through the second gear-clutch unit and said smaller spindle gear at all speeds of the intermediate shaft, whereby to limit the speed of rotation of the first gear-clutch unit on the intermediate shaft to a value proportionate to the difference between the speeds of rotation of the spindle and the intermediate shaft and the difference between the respective pitch line velocities of the large and smaller spindle gears.

19. The combination of claim 18, wherein there is also provided a rotary drive input shaft, a plurality of spaced clutch members mounted rigidly on said drive shaft and having helically extending face clutch teeth, a plurality of gear-clutch units mounted loosely on the drive shaft for limited sliding movement therealong, each of said gear-clutch units including a gear having helical gear teeth and a clutch having helically extending face clutch teeth shaped complementary to the clutch teeth on the respective adjacent clutch member on the drive shaft for meshing therewith in one extreme limit of movement of the respective gear-clutch unit along the drive shaft, a second shaft carrying gears having helical gear teeth meshing respectively with the helical gear teeth of the gear-clutch units in all positions of the latter along the drive shaft, the lead of the clutch teeth on said gear-clutch units and the adjacent clutch member on the drive shaft being equal to the lead of the gear teeth on the respective gear-clutch unit and the corresponding gear on the second shaft for neutralizing the end thrust on the respective gear-clutch unit due to the helical configuration of the meshing gear teeth when driven from the drive shaft, and means providing a driving connection from said second shaft to said intermediate shaft on which said first and second gear-clutch units are mounted.

References Cited in the file of this patent

UNITED STATES PATENTS

| | | |
|---|---|---|
| 1,143,044 | Fuchs | June 15, 1915 |
| 1,221,844 | Dow | Apr. 10, 1917 |
| 1,706,791 | Leighton | Mar. 26, 1929 |
| 1,758,427 | Burger | May 13, 1930 |
| 1,868,697 | Ellis | July 26, 1932 |
| 2,062,927 | Peterson | Dec. 1, 1936 |
| 2,269,290 | Schurger | Jan. 6, 1942 |
| 2,303,270 | Grover | Nov. 24, 1942 |
| 2,329,354 | McCarter | Sept. 14, 1943 |